United States Patent
Cheng et al.

(10) Patent No.: US 12,462,247 B2
(45) Date of Patent: Nov. 4, 2025

(54) METHOD AND SYSTEM OF IMPLEMENTING PREAPPROVED PULL TRANSFERS FROM A CRYPTO WALLET

(71) Applicant: MASTERCARD ASIA/PACIFIC PTE. LTD., Singapore (SG)

(72) Inventors: Karl Cheng, Singapore (SG); Srinath Ravinathan, Singapore (SG); Putu Arie Ganapathi, Singapore (SG); Phuoc Hoang Long Le, Singapore (SG)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 205 days.

(21) Appl. No.: 18/211,660

(22) Filed: Jun. 20, 2023

(65) Prior Publication Data
US 2024/0428231 A1    Dec. 26, 2024

(51) Int. Cl.
*G06Q 20/36* (2012.01)
*G06Q 20/38* (2012.01)

(52) U.S. Cl.
CPC ..... *G06Q 20/3674* (2013.01); *G06Q 20/3823* (2013.01); *G06Q 20/389* (2013.01); *G06Q 2220/00* (2013.01)

(58) Field of Classification Search
None
See application file for complete search history.

(56) References Cited

U.S. PATENT DOCUMENTS

| 11,195,177 B1 | 12/2021 | Vijayvergia |
| 11,436,597 B1 * | 9/2022 | Griffin ............... G06Q 20/3829 |
| 11,816,661 B2 * | 11/2023 | Sundararajan ..... G06Q 20/3827 |
| 2017/0286951 A1 * | 10/2017 | Ignatchenko ...... G06Q 20/3823 |

(Continued)

FOREIGN PATENT DOCUMENTS

CN    110932864 A    3/2020

OTHER PUBLICATIONS

"H.-E. Lee, W. Shin and K.-H. Kim, ""An Assistant Service for Customers in QR-payment with the Merchant Presented Mode,"" 2020 International Conference on Information Networking (ICOIN), Barcelona, Spain, 2020, pp. 682-686, doi: 10.1109/ICOIN48656.2020.9016491." (Year: 2020).*

(Continued)

*Primary Examiner* — Eduardo Castilho
(74) *Attorney, Agent, or Firm* — Panitch Schwarze Belisario & Nadel LLP (57) ABSTRACT

A method for automatic initiation of a blockchain transaction with a pre-approved recipient includes: receiving at least a recipient identifier and a transaction amount; performing a validation process to validate that (i) the recipient identifier is pre-approved by a user of the computing device for blockchain transactions, and (ii) the transaction amount is beneath a predetermined amount limit for blockchain transactions; generating a new blockchain transaction including at least the recipient identifier, the transaction amount, and one or more source addresses; digitally signing the new blockchain transaction using a private key of a first (Continued)

cryptographic key pair stored in a memory of the computing device; and transmitting the digitally signed new blockchain transaction to a blockchain node in a blockchain network.

16 Claims, 7 Drawing Sheets

(56) References Cited

U.S. PATENT DOCUMENTS

| | | | | |
|---|---|---|---|---|
| 2017/0317997 | A1* | 11/2017 | Smith | G06Q 20/407 |
| 2020/0065794 | A1* | 2/2020 | Kikinis | G06Q 20/3274 |
| 2020/0082933 | A1* | 3/2020 | Lu | G16H 40/20 |
| 2022/0076334 | A1* | 3/2022 | Filter | G06Q 20/3678 |
| 2022/0237574 | A1* | 7/2022 | Gomez | G06Q 20/065 |
| 2022/0245625 | A1* | 8/2022 | Filter | G06Q 20/387 |
| 2022/0309503 | A1 | 9/2022 | Sibbach | |
| 2023/0031874 | A1 | 2/2023 | Goldfield | |
| 2024/0281796 | A1* | 8/2024 | Finlow-Bates | G06Q 20/405 |
| 2024/0378594 | A1* | 11/2024 | Schoof | G06Q 20/3829 |

OTHER PUBLICATIONS

A. G. Khan, A. H. Zahid, M. Hussain and U. Riaz, "Security of Cryptocurrency Using Hardware Wallet and QR Code," 2019 International Conference on Innovative Computing (ICIC), Lahore, Pakistan, 2019, pp. 1-10, doi: 10.1109/ICIC48496.2019.8966739. (Year: 2019).*

C. Hayama, Y. Kamidoi and S. Wakabayashi, "Introduction of a New Method for Preventing Recipient Unapproved Transactions to Bitcoin Wallet," 2022 IEEE 46th Annual Computers, Software, and Applications Conference (COMPSAC), CA, USA, 2022, pp. 767-772, doi: 10.1109/COMPSAC54236.2022.00126. (Year: 2022).*

Kim et al., "E-commerce payment model using blockchain," J Ambient Intell Human Comput 13, 1673-1685 , 2022, https://doi.org/10.1007/s12652-020-02519-5 (Year: 2022).*

International Search Report dated Jul. 16, 2024 issued by the Intellectual Property Office in Singapore, in corresponding Application No. PCT/SG2024/050405 (10 pages).

Notification of Transmittal of the International Search Report and the Written Opinion of the International Searching Authority, or the Declaration, issued Jul. 17, 2024, in corresponding International Application No. PCT/SG2024/050405, 10 pages.

* cited by examiner

METHOD AND SYSTEM OF IMPLEMENTING PREAPPROVED PULL TRANSFERS FROM A CRYPTO WALLET

FIELD

The present disclosure relates to the implementing of pre-approved pull transfers from a crypto wallet, specifically the automatic initiation of blockchain transactions from a blockchain wallet for pre-approved recipients.

BACKGROUND

A standard blockchain transaction typically involves several exchanges of information between at least two user devices as well as a node in a blockchain network. At a minimum, when a sender wants to send blockchain currency to recipient, such as when a consumer is at a merchant and wants to purchase a product, the sender's device must receive a destination address from the recipient's device, the sender has to approve transaction details entered by its user or received from the recipient device, and the sender device must send out a new blockchain transaction to the blockchain node. Typically, transfer of the destination address from the recipient to the sender is performed using a machine-readable code, such as a QR code, displayed by the recipient device and read using the sender device, or via near field communication, where the transmission occurs when both devices are using a specific application program that has received specific instructions. Also, the use of QR codes is susceptible to fraud (e.g., someone replace the QR code with another QR code sticker or the like).

Such processes can be time consuming and frustrating for participants that are interested in a fast transaction, such as when a consumer is purchasing fast food, gas, or small sundry items at a convenience store for example. In particular, it can be a source of significant frustration for a consumer to have to repeatedly scan a QR code or use a special application program every time the consumer goes to a known and trusted merchant, especially one with which the consumer regularly transacts. However, there is no existing method for streamlining the transaction process for blockchain transactions.

Thus, there is a need for a technological improvement to the processing of blockchain transactions to allow for pre-approved recipients in a way that provides greater convenience and faster transactions using less computer resources to blockchain users without sacrificing security.

SUMMARY

The present disclosure provides a description of systems and methods for automatic initiation of blockchain transactions with pre-approved recipients. At a sender's computing device for a sender that is interested in transferring blockchain currency in a new blockchain transaction a recipient identifier and a transaction amount are received, which can be through user input, transfer from a recipient device, etc. The computing device performs a validation process to ensure that the recipient identifier is pre-approved by the sender and that the transaction amount is within any established transfer limit. If the validation is successful, the device automatically generates a new blockchain transaction that is digitally signed and submitting to a blockchain node. The result is an automatic blockchain transaction that requires only a single action of the sender and one or even no actions by the recipient. The validation process can use information securely stored in the device itself, a smart contract stored on the blockchain, or a trusted third party provider that is trusted and authorized to perform such validations. In each case, the sender need only confirm the recipient and amount and everything else is handled automatically, streamlining the process for the sender and recipient and without sacrificing the security and benefits of a blockchain.

A method for automatic initiation of a blockchain transaction with a pre-approved recipient includes: receiving, by a receiver of a computing device, at least a recipient identifier and a transaction amount; performing, by a processor of the computing device, a validation process to validate that (i) the recipient identifier is pre-approved by a user of the computing device for blockchain transactions, and (ii) the transaction amount is beneath a predetermined amount limit for blockchain transactions; generating, by the processor of the computing device, a new blockchain transaction including at least the recipient identifier, the transaction amount, and one or more source addresses; digitally signing, by the processor of the computing device, the new blockchain transaction using a private key of a first cryptographic key pair stored in a memory of the computing device; and transmitting, by a transmitter of the computing device, the digitally signed new blockchain transaction to a blockchain node in a blockchain network.

A system for automatic initiation of a blockchain transaction with a pre-approved recipient includes: a blockchain network; a blockchain node included in the blockchain network; and a computing device, the computing device including a memory storing a private key of a first cryptographic key pair, a receiver receiving at least a recipient identifier and a transaction amount, a processor performing a validation process to validate that (i) the recipient identifier is pre-approved by a user of the computing device for blockchain transactions, and (ii) the transaction amount is beneath a predetermined amount limit for blockchain transactions, generating a new blockchain transaction including at least the recipient identifier, the transaction amount, and one or more source addresses, and digitally signing the new blockchain transaction using the private key of a first cryptographic key pair, and a transmitter transmitting the digitally signed new blockchain transaction to the blockchain node.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments is intended for illustration purposes only and are, therefore, not intended to necessarily limit the scope of the disclosure.

DETAILED DESCRIPTION

System for Automatic Initiation of Blockchain Transactions

Figure 1:
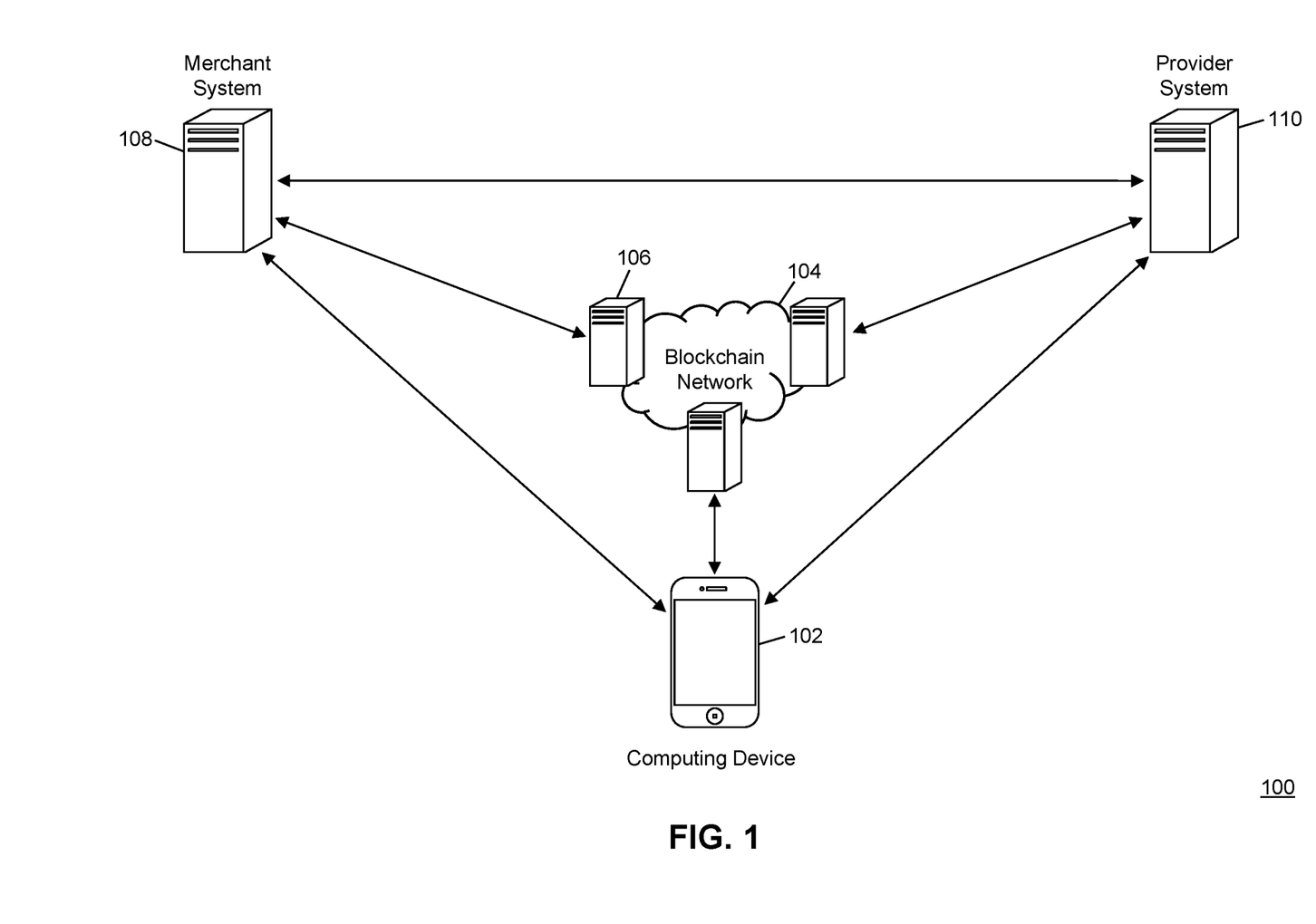
FIG. 1 is a block diagram illustrating a high level system architecture for automatic initiation of blockchain transactions with pre-approved recipients in accordance with exemplary embodiments.

FIG. 1 illustrates a system 100 for the automatic initiation of a blockchain transaction that is with a pre-approved recipient.

The system 100 can include a computing device 102. The computing device 102, discussed in more detail below, can be a device possessed or otherwise used by a user, such as a desktop computer, laptop computer, tablet computer, notebook computer, cellular phone, smart phone, smart watch, smart television, wearable computing device, automated teller machine, point of sale system, etc. The user can utilize the computing device 102 to use and manage a blockchain wallet that can perform automatic transactions with a pre-approved recipient.

Figure 5:
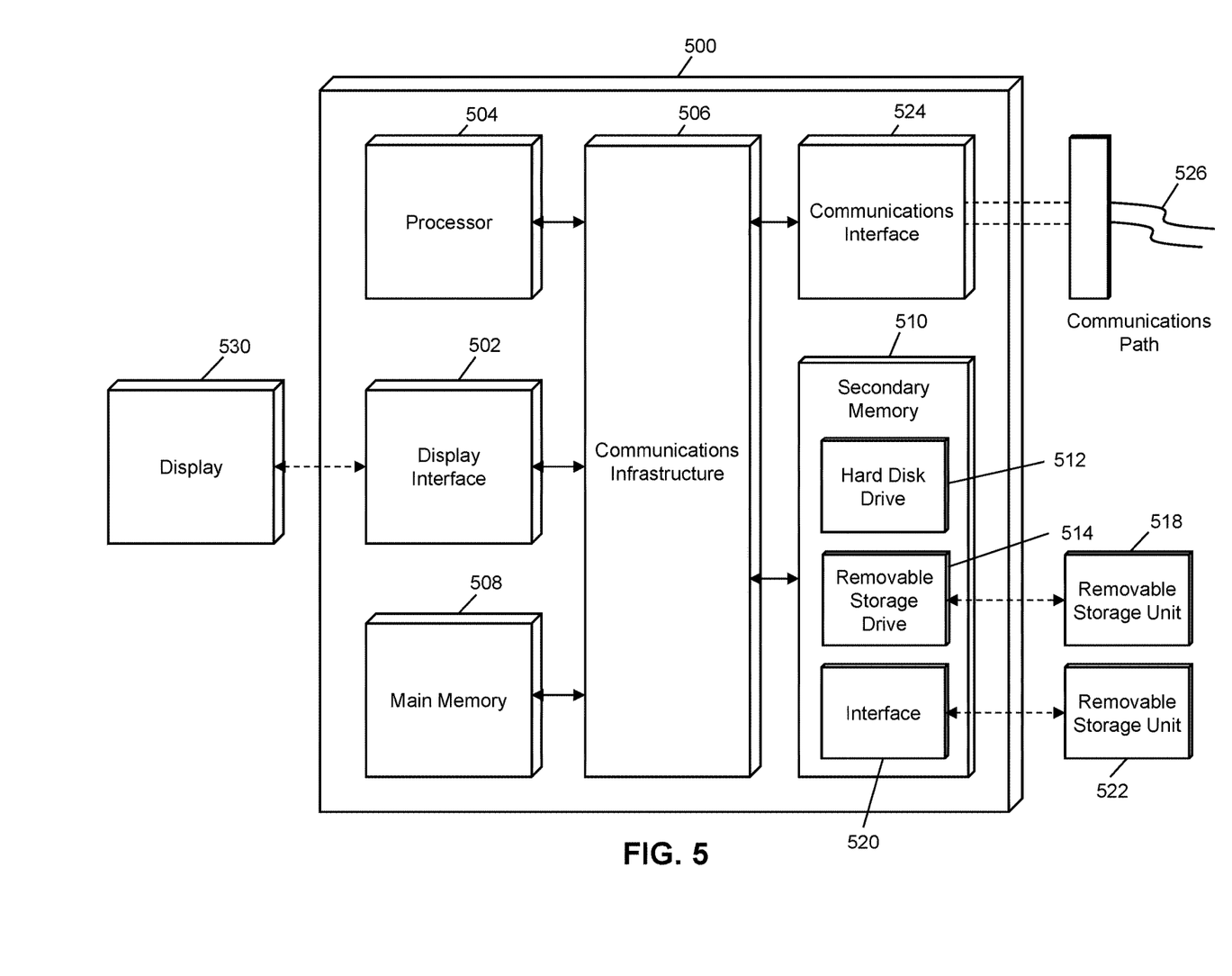
FIG. 5 is a block diagram illustrating a computer system architecture in accordance with exemplary embodiments.

The system 100 can include a blockchain network 104. The blockchain network 104 can be comprised of a plurality of blockchain nodes 106. Each blockchain node 106 can be a computing system, such as illustrated in FIG. 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain.

The blockchain can be a distributed ledger that is comprised of at least a plurality of blocks. Each block can include at least a block header and one or more data values. Each block header can include at least a timestamp, a block reference value, and a data reference value. The timestamp can be a time at which the block header was generated and can be represented using any suitable method (e.g., UNIX timestamp, DateTime, etc.). The block reference value can be a value that references an earlier block (e.g., based on timestamp) in the blockchain. In some embodiments, a block reference value in a block header can be a reference to the block header of the most recently added block prior to the respective block. In an exemplary embodiment, the block reference value can be a hash value generated via the hashing of the block header of the most recently added block. The data reference value can similarly be a reference to the one or more data values stored in the block that includes the block header. In an exemplary embodiment, the data reference value can be a hash value generated via the hashing of the one or more data values. For instance, the block reference value can be the root of a Merkle tree generated using the one or more data values.

The use of the block reference value and data reference value in each block header can result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single blockchain node 106 in the blockchain network 104 prior to the generation and addition of a new block to the blockchain in order for the change to be made permanent. Computational and communication limitations can make such a modification exceedingly difficult, if not impossible, thus rendering the blockchain immutable.

In some embodiments, the blockchain can be used to store information regarding blockchain transactions conducted between two different blockchain wallets. A blockchain wallet can include a private key of a cryptographic key pair that is used to generate digital signatures that serve as authorization by a payer for a blockchain transaction, where the digital signature can be verified by the blockchain network 104 using the public key of the cryptographic key pair. In some cases, the term "blockchain wallet" can refer specifically to the private key. In other cases, the term "blockchain wallet" can refer to a computing device (e.g., computing device 102, etc.) that stores the private key for use thereof in blockchain transactions. For instance, each computing device can each have their own private key for respective cryptographic key pairs and can each be a blockchain wallet for use in transactions with the blockchain associated with the blockchain network. Computing devices can be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain can correspond to a blockchain transaction or other storage of data, as applicable. A blockchain transaction can consist of at least: a digital signature of the sender of currency (e.g., a computing device 102) that is generated using the sender's private key, a blockchain address of the recipient of currency (e.g., a merchant system 108) generated using the recipient's public key, and a blockchain currency amount that is transferred or other data being stored. In some blockchain transactions, the transaction can also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," or account balance due to there being currency sent to the address in a prior transaction where that currency is still unspent. In some cases, a blockchain transaction can also include the sender's public key, for use by an entity in validating the transaction. For the traditional processing of a blockchain transaction, such data can be provided to a blockchain node 106 in the blockchain network 104, either by the sender or the recipient. The node can verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block can be validated by other blockchain nodes 106 in the blockchain network 104 before being added to the blockchain and distributed to all of the blockchain nodes 106 in the blockchain network 104, respectively, in traditional blockchain implementations. In cases where a blockchain data value cannot be related to a blockchain transaction, but instead the storage of other types of data, blockchain data values can still include or otherwise involve the validation of a digital signature.

In the system 100, the user of the computing device 102, as a sender, can be interested in conducting recurring blockchain transactions with a merchant system 108, as a recipient. In order to streamline the process, the computing device 102 can register the merchant system 108 as a pre-approved recipient for blockchain transactions. The process for pre-approving a recipient discussed below occurs during the processing of a new blockchain transaction. However, the pre-approval process can occur outside of the context of a blockchain transaction using the same or similar steps for identifying the parties involved and providing consent for registering a recipient as pre-approved.

When a user of the computing device 102 is interested in transferring blockchain currency to the merchant system 108, such as for the purchase of one or more goods or services, the computing device 102 can receive a recipient identifier associated with the merchant system 108 and a transaction amount. The data can be received from by the computing device 102 via a near field communication transmission from the merchant system 108 using a suitable communication method, read from a machine-readable code, such as a quick response (QR) code displayed by the merchant system 108 or at a geographic location associated therewith, input by the user of the computing device 102 using a suitable input device thereof, or any other suitable method. The transaction amount can be the amount of blockchain currency that is to be transferred from the computing device's blockchain wallet to the blockchain wallet of the merchant system 108. The recipient identifier can be any value used for identification of the blockchain wallet of the merchant system 108, such as an identification number, a blockchain address generated via a public key of the merchant system's blockchain wallet, the public key itself, or other suitable value.

Once the computing device 102 has received the data, the computing device 102 can perform a validation process to check if the merchant system 108, identified via the recipient identifier, is a pre-approved recipient. In some embodiments, recipient identifiers for pre-approved recipients can be stored locally in the computing device 102, such as in a secure element or other secure storage of the computing device 102. In such embodiments, the computing device 102 can check the appropriate storage media and location for the recipient identifier, where the validation is successful if the recipient identifier is found.

In other embodiments, smart contracts can be used to store registered pre-approvals for recipients. In such an embodiment, a smart contract can be stored on the blockchain associated with the blockchain network 104 that includes a sender identifier associated with the computing device's blockchain wallet and the recipient identifier for any pre-approved recipient. In such instances, the computing device 102 can check the smart contract stored on the blockchain that includes its sender identifier and determine if the recipient identifier for the merchant system 108 is included therein, where the validation is successful if the recipient identifier is found. In some instances, the computing device 102 can request that the check be performed by a blockchain node 106 in the blockchain network 104, or via a provider system 110. The provider system 110 can be a computing system, such as the computing system illustrated in FIG. 5 and discussed below, that is configured to assist in the pre-approval of merchants and validation processes related thereto, as discussed herein. In such instances, the computing device 102 can electronically transmit its sender identifier and the recipient identifier to the provider system 110, which can identify the smart contract that includes the sender identifier, and return a validation result to the computing device 102 that is positive if the smart contract includes the recipient identifier or negative if the recipient identifier is not included.

In another embodiment, the provider system 110 can store data related to the registration of pre-approved recipients for blockchain wallets. In such an embodiment, the computing device 102 can electronically transmit its sender identifier and the recipient identifier to the provider system 110 using a suitable communication network and method. The provider system 110 can identify a profile associated with the computing device 102, and then determine if the recipient identifier is registered as a pre-approved recipient in that profile. The provider system 110 can then return a result to the computing device 102 for the validation process that is positive if the recipient identifier is registered as a pre-approved recipient or negative if the recipient identifier is not registered as such.

In some cases, the validation process performed by the computing device 102 can also include validation based on the transaction amount for the proposed blockchain transaction. In such cases, a registered recipient identifier can have a predetermined amount limit associated therewith that is stored with the recipient identifier (e.g., in the secure storage of the computing device 102, in the smart contract on the blockchain, in the profile for the computing device 102 in the provider system 110, etc.). If the recipient identifier is determined to belong to a registered, pre-approved recipient, the transaction amount received by the computing device 102 for the proposed blockchain transaction can be compared against the predetermined amount limit associated with the recipient identifier. If the transaction amount exceeds the predetermined amount limit, the validation process will be unsuccessful. If the transaction amount is within the predetermined amount limit, then the validation process will be successful.

When a validation process is unsuccessful, the computing device 102 can prompt the user to confirm the details of the proposed blockchain transaction. Specifically, the computing device 102 can prompt the user to confirm the merchant system 108 as the intended recipient and that the transaction amount is correct. If the recipient identifier is registered as pre-approved but the transaction amount was above the predetermined amount limit, then the transaction will be initiated once the user confirms the details of the transaction. If the recipient identifier was not registered as pre-approved (e.g., the validation process was unsuccessful and/or had a negative result indicating as much), then the computing device 102 can prompt the user for registration of the recipient identifier as being associated with a pre-approved recipient for future transactions. The prompt to the user can also include a request for the user to provide an amount limit for pre-approved transactions with that recipient. If the user is not interested in registering the recipient identifier, then the blockchain transaction can be submitted and processed using standard methods, such as discussed above.

If the user wants to register the recipient identifier as being associated with a pre-approved recipient, then the computing device 102 can perform a registration process for the recipient identifier. The actions involved in the registration process can depend on where the information regarding pre-approved recipient identifiers is stored. For instance, in cases where the computing device 102 stores pre-approved recipient identifiers, the computing device 102 can store the recipient identifier and the associated amount limit in the appropriate secure storage that is used to store registered, pre-approved recipient identifiers. In cases where pre-approval data is stored in smart contracts, the computing device 102 can electronically transmit the sender identifier, recipient identifier, and amount limit to a blockchain node 106 or provider system 110, which can be digitally signed by the computing device's private key for security and verification purposes. The blockchain node 106 or provider system 110 can then add a new smart contract to the blockchain for the computing device 102 that includes the sender identifier and any of the data included in any prior smart contract for the computing device 102, as well as the new recipient identifier and corresponding amount limit. In cases where the provider system 110 maintains pre-approval registrations, the computing device 102 can transmit the sender identifier, recipient identifier, and amount limit to the provider system 110. The provider system 110 can then add the recipient identifier and amount limit to a profile associated with the computing device 102, which can be identified using the sender identifier.

After the user has provided consent for pre-approval registration and the computing device 102 has performed the registration process, the computing device 102 can initiate the blockchain transaction. Initiation of the blockchain transaction can include the generation of a new blockchain transaction that includes a recipient address (e.g., the recipient identifier or identified using the recipient identifier), the amount limit, and one or more unspent transaction or account balance outputs controlled by the computing device's blockchain wallet. The computing device 102 can then digitally sign the new blockchain transaction using the private key of its cryptographic key pair. The computing device 102 can electronically transmit the signed blockchain transaction to a blockchain node 106 using a suitable communication network and method. The blockchain node 106 can validate the transaction, confirm the transaction, and add the transaction to the blockchain in a new block using methods discussed above. The result is a new blockchain transaction that, if the recipient is pre-approved, can occur with only a single action by the user.

In some embodiments, the provider system 110 can be configured to onboard merchant systems 108 as authorized recipients for pre-approval. In such embodiments, only a merchant system 108 that has been successfully onboarded can have its recipient identifier registered as a pre-approved recipient. As part of an onboarding process, the merchant system 108 can electronically transmit its recipient identifier to the provider system 110 along with any other suitable data, such as identification data for the merchant system 108, which can include a merchant identification number. The provider system 110 can receive the recipient identifier and other suitable data and verify the identity of the merchant system 108. The provider system 110 can then determine if the merchant system 108 is a trusted merchant. Determination if the merchant system 108 is a trusted merchant can vary based on provider system 110, governmental regulations, regulations set by the blockchain network 104, or other suitable criteria. In some cases, the provider system 110 can require the merchant to execute a contract that serves as an agreement by the merchant to any necessary rules or restrictions to be authorized as a pre-approved recipient. In these embodiments, the provider system 110 can verify that a recipient identifier received from a computing device 102 or blockchain node 106 for registration as a pre-approved recipient belongs to a merchant system 108 that has been successfully onboarded. If the merchant system 108 has not been onboarded, the provider system 110 can deny the registration, and can inform the computing device 102 that the merchant system 108 has not passed the required verification requirements to be registered as a pre-approved recipient. In some instances, merchant onboarding can be declined as a requirement by a computing device 102. In some such instances, declining such a requirement can be limited to amount limits that are below a predetermined threshold.

The methods and systems discussed herein provide for the ability for a user to engage in blockchain transactions with a pre-approved recipient that require significantly less interaction by the sender and, in some cases, no participation entirely by the recipient. A blockchain transaction with a pre-approved recipient can occur with only being provided a selection of the recipient and the transaction amount, which can be input by the user or received from the merchant system 108, where the computing device 102 will perform all other necessary actions for the blockchain transaction without participation of the user. Thus, the methods and systems discussed herein provide for a significant technological improvement over existing systems.

Computing Device

Figure 2:
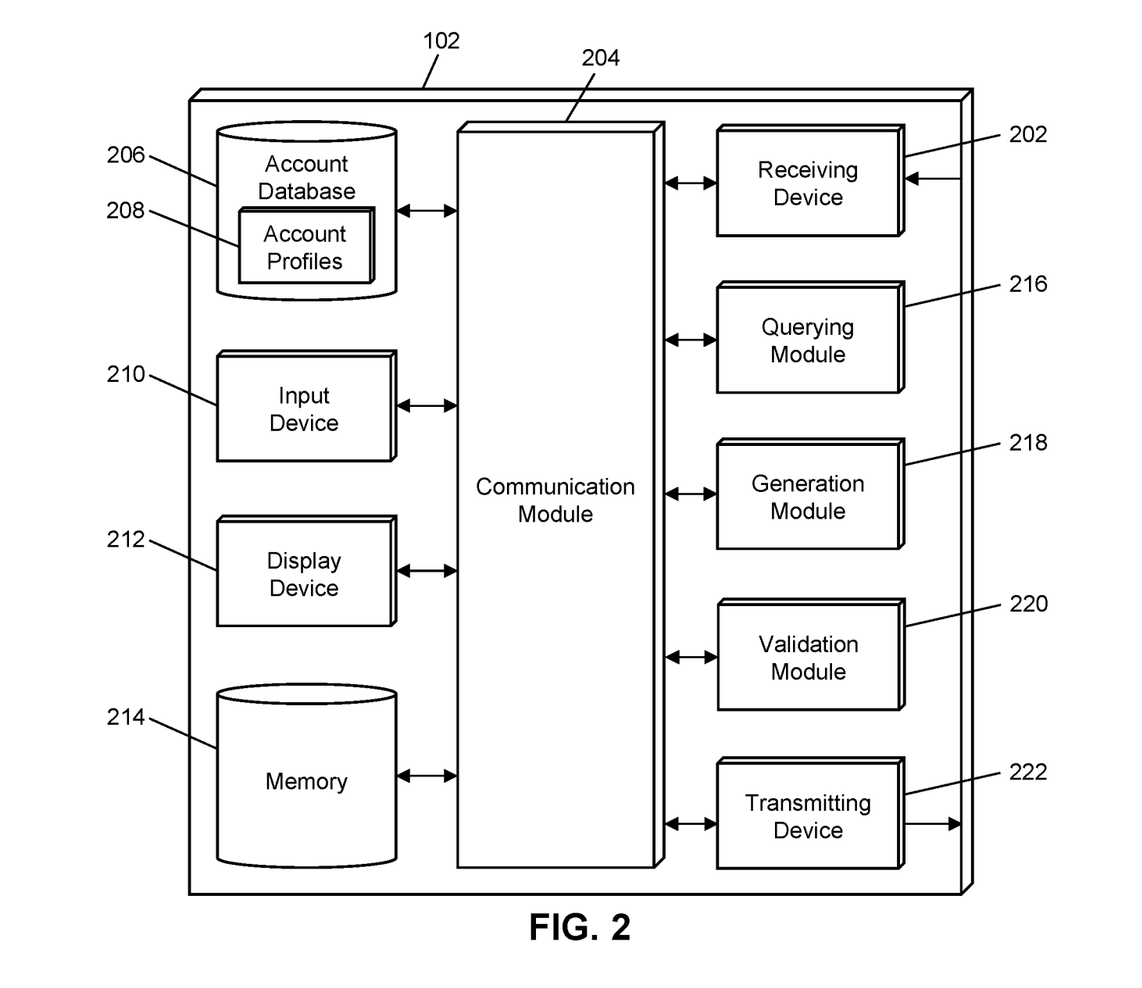
FIG. 2 is a block diagram illustrating the computing device in the system of FIG. 1 for the automatic initiation of blockchain transactions with pre-approved recipients in accordance with exemplary embodiments.

FIG. 2 illustrates an embodiment of a computing device 102. It will be apparent to persons having skill in the relevant art that the embodiment of the computing device 102 illustrated in FIG. 2 is provided as illustration only and cannot be exhaustive to all possible configurations of the computing device 102 suitable for performing the functions as discussed herein. For example, the computer system 500 illustrated in FIG. 5 and discussed in more detail below can be a suitable configuration of the computing device 102. In some cases, additional components of the system 100, such as the blockchain nodes 106, merchant system 108, and provider system 110 can include the components illustrated in FIG. 2 and discussed below.

The computing device 102 can include a receiving device 202. The receiving device 202 can be configured to receive data over one or more networks via one or more network protocols. In some instances, the receiving device 202 can be configured to receive data from blockchain nodes 106, merchant systems 108, provider systems 110, and other systems and entities via one or more communication methods, such as radio frequency, local area networks, wireless area networks, cellular communication networks, Bluetooth, the Internet, etc. In some embodiments, the receiving device 202 can be comprised of multiple devices, such as different receiving devices for receiving data over different networks, such as a first receiving device for receiving data over a local area network and a second receiving device for receiving data via the Internet. The receiving device 202 can receive electronically transmitted data signals, where data can be superimposed or otherwise encoded on the data signal and decoded, parsed, read, or otherwise obtained via receipt of the data signal by the receiving device 202. In some instances, the receiving device 202 can include a parsing module for parsing the received data signal to obtain the data superimposed thereon. For example, the receiving device 202 can include a parser program configured to receive and transform the received data signal into usable input for the functions performed by the processing device to carry out the methods and systems described herein.

The receiving device 202 can be configured to receive data signals electronically transmitted by blockchain nodes 106 that can be superimposed or otherwise encoded with blockchain data, transaction identifiers, smart contract data, verification results, etc. The receiving device 202 can also be configured to receive data signals electronically transmitted by merchant systems 108 that can be superimposed or otherwise encoded with recipient identifiers, transaction amounts, transaction requests, etc. The receiving device 202 can also be configured to receive data signals electronically transmitted by provider systems 110, which can be superimposed or otherwise encoded with verification results, pre-approval requests, blockchain data, smart contract data, etc.

The computing device 102 can also include a communication module 204. The communication module 204 can be configured to transmit data between modules, engines, databases, memories, and other components of the computing device 102 for use in performing the functions discussed herein. The communication module 204 can be comprised of one or more communication types and utilize various communication methods for communications within a computing device. For example, the communication module 204 can be comprised of a bus, contact pin connectors, wires, etc. In some embodiments, the communication module 204 can also be configured to communicate between internal components of the computing device 102 and external components of the computing device 102, such as externally connected databases, display devices, input devices, etc. The computing device 102 can also include a processing device. The processing device can be configured to perform the functions of the computing device 102 discussed herein as will be apparent to persons having skill in the relevant art. In some embodiments, the processing device can include and/or be comprised of a plurality of engines and/or modules specially configured to perform one or more functions of the processing device, such as a querying module 216, generation module 218, validation module 220, etc. As used herein, the term "module" can be software or hardware particularly programmed to receive an input, perform one or more processes using the input, and provides an output. The input, output, and processes performed by various modules will be apparent to one skilled in the art based upon the present disclosure.

The computing device 102 can also include an account database 206. The account database 206 can be configured to store one or more account profiles 208 using a suitable data storage format and schema. The account database 206 can be a relational database that utilizes structured query language for the storage, identification, modifying, updating, accessing, etc. of structured data sets stored therein. Each account profile 208 can be a structured data set configured to store data related to a blockchain wallet, which can include its cryptographic key pair, registered pre-approved recipient identifiers, corresponding amount limits, unspent transaction outputs or account balance, etc. In some cases, each account profile 208 can be associated with a registered pre-approved recipient. In such cases, an account profile 208 can store at least the recipient identifier and approved amount limit for the associated recipient.

The computing device 102 can also include a memory 214. The memory 214 can be configured to store data for use by the computing device 102 in performing the functions discussed herein, such as public and private keys, symmetric keys, etc. The memory 214 can be configured to store data using suitable data formatting methods and schema and can be any suitable type of memory, such as read-only memory, random access memory, etc. The memory 214 can include, for example, encryption keys and algorithms, communication protocols and standards, data formatting standards and protocols, program code for modules and application programs of the processing device, and other data that can be suitable for use by the computing device 102 in the performance of the functions disclosed herein as will be apparent to persons having skill in the relevant art. In some embodiments, the memory 214 can be comprised of or can otherwise include a relational database that utilizes structured query language for the storage, identification, modifying, updating, accessing, etc. of structured data sets stored therein. The memory 214 can be configured to store, for example, cryptographic keys, cryptographic key pairs, cryptographic algorithms, encryption algorithms, communication information, data formatting rules, network identifiers, payment details, blockchain wallet data, etc.

The computing device 102 can also include an input device 210. The input device 210 can be configured to receive input by a user (e.g., the consumer 114) of the computing device 102, which can be provided to other devices or modules of the computing device 102, such as via the communication module 204. The input device 210 can be comprised of one or more input devices, which can include, for instance, a capacitive touch display, microphone, keyboard, mouse, camera, optical imaging device, trackpad, keypad, etc. The input device 210 can, for example, receive instructions from the user for the pre-approval of a recipient, a recipient identifier and amount for a new blockchain transaction, etc.

The computing device 102 can also include a display device 212. The display device 212 can be configured to display data to a user (e.g., consumer 114) using one or more graphical user interfaces. Data for display on the display device 212 can be provided thereto by other devices or modules of the computing device 102 via the communication module 204. The display device 212 can be comprised of one or more devices, which can include, for instance, a capacitive touch display, liquid crystal display, light emitting diode display, thin film transistor display, etc. The display device 212 can be configured to display application program data via one or more user interfaces to the consumer 114, such as for the selection of commands to, for example, generate a blockchain wallet, select a recipient for a blockchain transaction, input a transaction amount, provide consent for pre-approval of a recipient, etc.

The computing device 102 can include a querying module 216. The querying module 216 can be configured to execute queries on databases to identify information. The querying module 216 can receive one or more data values or query strings and can execute a query string based thereon on an indicated database, such as the entity database 206 of the computing device 102 to identify information stored therein. The querying module 216 can then output the identified information to an appropriate engine or module of the computing device 102 as necessary. The querying module 216 can, for example, execute a query on the account database 206 to identify an account profile 208 associated with a recipient to identify an predetermined amount limit associated therewith for use in a verification process.

The computing device 102 can also include a generation module 218. The generation module 218 can be configured to generate data for use by the computing device 102 in performing the functions discussed herein. The generation module 218 can receive instructions as input, can generate data based on the instructions, and can output the generated data to one or more modules of the computing device 102. For example, the generation module 218 can be configured to generate data messages, notification messages, response messages, cryptographic keys, blockchain transactions, blockchain data values, digital signatures, instructions, etc.

The computing device 102 can also include a validation module 220. The validation module 220 can be configured to perform validations for the computing device 102 as part of the functions discussed herein. The validation module 220 can receive instructions as input, which can also include data to be used in performing a validation, can perform a validation as requested, and can output a result of the validation to another module or engine of the computing device 102. The validation module 220 can, for example, be configured to perform the validation process discussed above to validate that (i) the recipient identifier for a new blockchain transaction is pre-approved by a user of the computing device 102 for blockchain transactions, and (ii) the transaction amount for the new blockchain transaction is beneath a predetermined amount limit for blockchain transactions.

The computing device 102 can also include a transmitting device 222. The transmitting device 222 can be configured to transmit data over one or more networks via one or more network protocols. In some instances, the transmitting device 222 can be configured to transmit data to blockchain nodes 106, merchant systems 108, provider systems 110, and other entities via one or more communication methods, local area networks, wireless area networks, cellular communication, Bluetooth, radio frequency, the Internet, etc. In some embodiments, the transmitting device 222 can be comprised of multiple devices, such as different transmitting devices for transmitting data over different networks, such as a first transmitting device for transmitting data over a local area network and a second transmitting device for transmitting data via the Internet. The transmitting device 222 can electronically transmit data signals that have data superimposed that can be parsed by a receiving computing device. In some instances, the transmitting device 222 can include one or more modules for superimposing, encoding, or otherwise formatting data into data signals suitable for transmission.

The transmitting device 222 can be configured to electronically transmit data signals to blockchain nodes 106 that can be superimposed or otherwise encoded with requests for blockchain data, requests for smart contract data, validation requests, new blockchain transactions, etc. The transmitting device 222 can also be configured to electronically transmit data signals to merchant systems 108, which can be superimposed or otherwise encoded with transaction requests, requests for recipient identifiers, requests for transaction amounts, transaction identifiers, notification messages, etc. The transmitting device 222 can also be configured to electronically transmit data signals to provider systems 110 that can be superimposed or otherwise encoded with validation requests, pre-approval registration data, recipient identifiers, sender identifiers, amount limits, transaction amounts, etc.

Process for Automatic Initiation of Blockchain Transactions

Figure 3A:
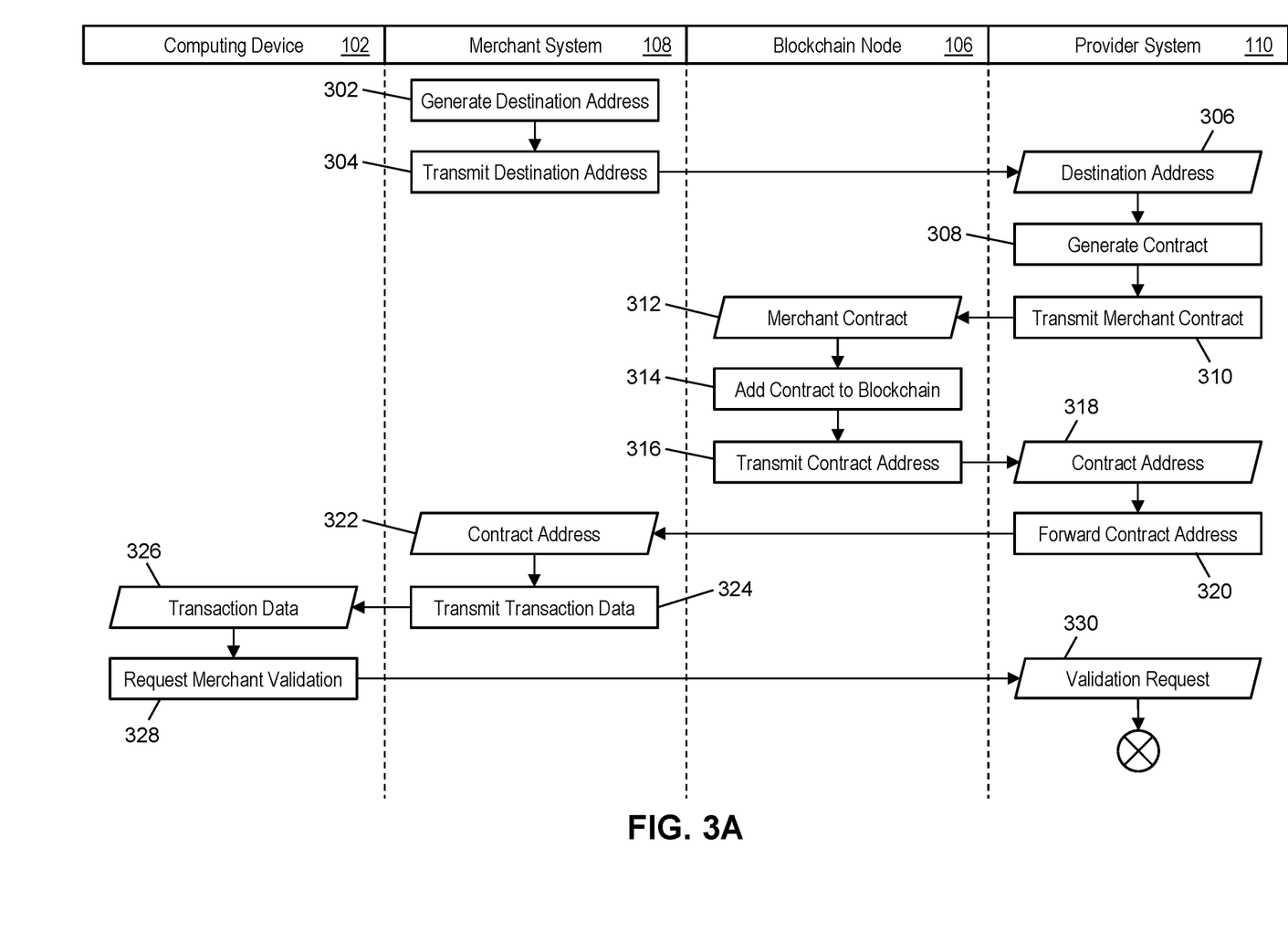
FIGS. 3A-3C are a flow diagram illustrating a process for automatic initiation of a blockchain transaction with a pre-approved recipient as performed by the system of FIG. 1 in accordance with exemplary embodiments.
Figure 3B:
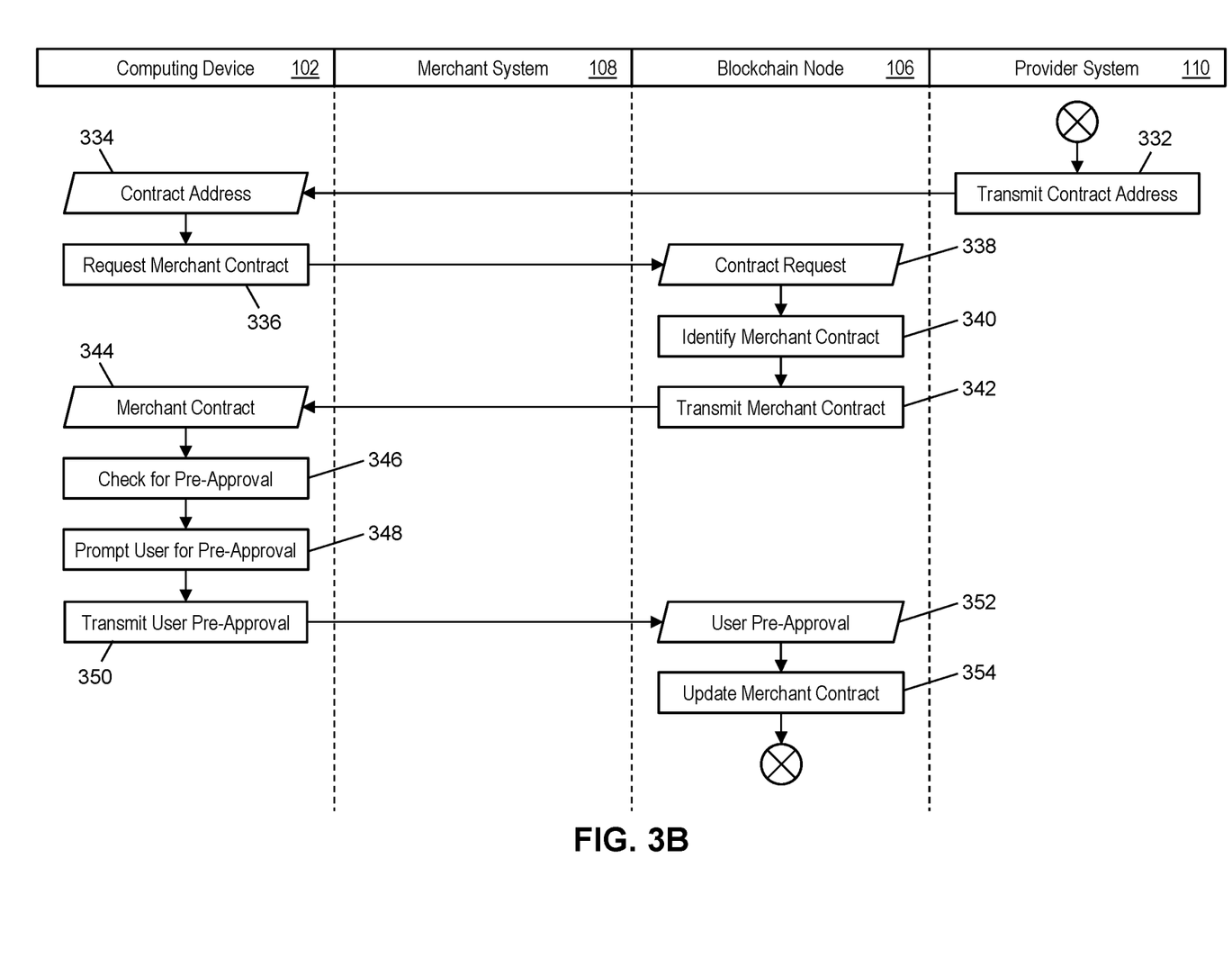
Figure 3C:
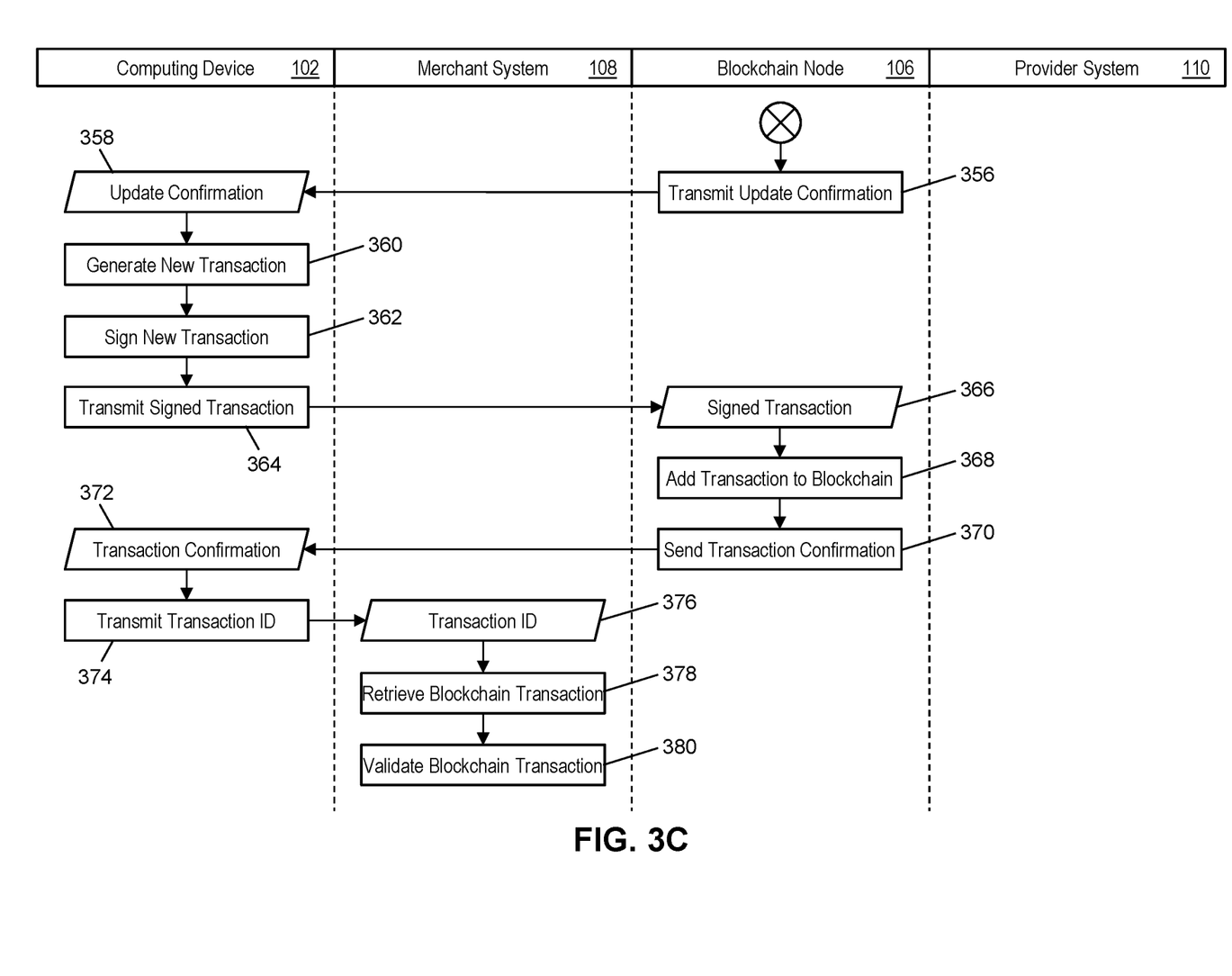

FIGS. 3A-3C illustrate a process 300 for onboarding of a merchant system 108 and pre-approval registration by the computing device 102 during a new blockchain transaction for future automatic initiation in the system 100 of FIG. 1.

In step 302, a merchant system 108 can generate a destination address to be used to receive blockchain currency in future pre-approved transactions. The merchant system 108 can generate the destination address using a public key of the cryptographic key pair that serves as the merchant system's blockchain wallet. In step 304, the merchant system 108 can electronically transmit the destination address, as a recipient identifier, to the provider system 110 as an onboarding request using a suitable communication network and method, along with any other suitable data, such as a contract acceptance, digital signature, merchant identification value, etc. In step 306, the provider system 110 can receive the destination address and other suitable data from the merchant system 108.

In step 308, the provider system 110 can generate a merchant contract, which can be a smart contract, that includes the destination address and any other relevant data, such as a digital signature generated by the merchant system's private key of its cryptographic key pair, and the merchant system's public key. In the illustrated example, the merchant contract is also used to store the sender identifiers for any computing devices 102 that have registered the merchant system 108 as a pre-approved recipient. In step 310, the provider system 110 can electronically transmit the merchant contract to a blockchain node 106 for storage on the blockchain using any suitable communication network and method. In step 312, the blockchain node 106 can receive the merchant contract from the provider system 110. In step 314, the blockchain node 106 can add the merchant contract to the blockchain, such as by including the merchant contract as a blockchain data value in a new block that is generated, confirmed, and added to the blockchain using standard processes. As part of the adding of the merchant contract to the blockchain, the blockchain node 106 can identify a transaction identifier for the blockchain data value that includes the merchant contract as an address to identify the merchant contract on the blockchain. In step 316, the blockchain node 106 can electronically transmit the contract address to the provider system 110.

In step 318, the provider system 110 can receive the contract address from the blockchain node 106. In step 320, the provider system 110 can forward the contract address to the merchant system 108 as a response to the initial onboarding request. In step 322, the merchant system 108 can receive the contract address. After the merchant system 108 has been onboarded, the merchant system 108 can initiate a new blockchain transaction with the computing device 102 by electronically transmitting transaction data for the blockchain transaction to the computing device 102 using a suitable communication network and method, in step 324. The transaction data can include at least the destination address and transaction amount for the transaction. In some cases, the transaction data can also include the contract address.

In step 326, the receiving device 202 of the computing device 102 can receive the transaction data from the merchant system 108. In step 328, the transmitting device 222 of the computing device 102 can electronically transmit a request to validate the merchant system 108 to the provider system 110 using a suitable communication network and method. The validation request can include at least the destination address for the merchant system 108 received in the transaction data. In step 330, the provider system 110 can receive the validation request. The provider system 110 can identify the contract address for the merchant contract for the merchant system 108 using the recipient identifier and, in step 332, electronically transmit the contract address back to the computing device 102 in response to the validation request. In step 334, the receiving device 202 of the computing device 102 can receive the contract address from the provider system 110.

In step 336, the computing device 102 can electronically transmit a request for the merchant contract to a blockchain node 106 in the blockchain network 104 that includes the contract address received from the provider system 110 using a suitable communication network and method. In step 338, the blockchain node 106 can receive the contract request with the contract address from the computing device 102. In step 340, the blockchain node 106 can identify the merchant contract stored on the blockchain via the contract address, by locating the blockchain data value at the contract address and identifying the merchant contract therein. In step 342, the blockchain node 106 can electronically transmit the identified merchant contract back to the computing device 102 in response to the contract request. In step 344, the receiving device 202 of the computing device 102 can receive the merchant contract from the blockchain node 106.

In step 346, the validation module 220 of the computing device 102 can check if the merchant system 108 has been pre-approved for blockchain transactions. In the example illustrated in FIGS. 3A-3C, the validation module 220 can analyze the merchant contract to check if the sender identifier of the computing device's blockchain wallet is included in the merchant contract, and determine that the merchant system 108 has not be pre-approved for blockchain transactions. In step 348, the computing device 102 can, using the input device 210 and display device 212, prompt the user of the computing device 102 to provide consent to register the merchant system 108 as a pre-approved recipient for blockchain transactions. As part of the prompt, the user can provide an amount and/or frequency limit for pre-approved transactions where the merchant system 108 is a recipient. In step 350, the transmitting device 222 of the computing device 102 can electronically transmit the user's pre-approval to the blockchain node 106.

In step 352, the blockchain node 106 can receive the user's pre-approval from the computing device 102. The pre-approval can include at least the recipient identifier, sender identifier, and amount limit. In some cases, the pre-approval can also include the contract address for the merchant contract. In step 354, the blockchain node 106 can update the merchant contract by including the sender identifier and amount limit in the merchant contract, which is then included in a new blockchain data value and stored on the blockchain. In step 356, the blockchain node 106 can electronically transmit a confirmation message to the computing device 102 indicating that the merchant contract was successfully update to register the pre-approval of the merchant system 108 for the computing device 102. In some cases, the updating confirmation message can include a new contract address for the updated merchant contract. In some instances, the blockchain node 106 can also electronically transmit an update confirmation message to the merchant system 108 with the new contract address.

In step 358, the receiving device 202 of the computing device 102 can receive the update confirmation message. In some cases, the validation module 220 of the computing device 102 can verify that the updated merchant contract includes the sender identifier and amount limit using the updated contract address. In step 360, the generation module 218 of the computing device 102 can generate a new blockchain transaction. The new blockchain transaction can include at least the destination address for the merchant system 108, the transaction amount, and one or more unspent transaction outputs or account/balance information of the computing device's blockchain wallet. In step 362, the generation module 218 of the computing device 102 can generate a digital signature over the new blockchain transaction using the private key of the cryptographic key pair of the computing device's blockchain wallet. In step 364, the transmitting device 222 of the computing device 102 can electronically transmit the signed blockchain transaction to the blockchain node 106.

In step 366, the blockchain node 106 can receive the signed blockchain transaction from the computing device 102. In step 368, the blockchain node 106 can validate and confirm the new blockchain transaction, add the new blockchain transaction to a new block, and have the new block confirmed and added to the blockchain. As part of the adding of the blockchain transaction to the blockchain, a transaction identifier can be identified for the blockchain transaction. In step 370, the blockchain node 106 can electronically transmit a transaction confirmation message to the computing device 102 that includes the transaction identifier for the new blockchain transaction.

In step 372, the receiving device 202 of the computing device 102 can receive the transaction confirmation message from the blockchain node 106. In step 374, the transmitting device 222 of the computing device 102 can electronically transmit the transaction identifier for the new blockchain transaction to the merchant system 108 using a suitable communication network and method. In step 376, the merchant system 108 can receive the transaction identifier from the computing device 102. In step 378, the merchant system 108 can identify the blockchain transaction stored on the blockchain using the transaction identifier. In step 380, the merchant system 108 can validate that the blockchain transaction was for the correct amount of blockchain currency and transmitted to the correct destination address supplied by the merchant system 108.

Exemplary Method for Automatic Initiation of a Blockchain Transaction

Figure 4:
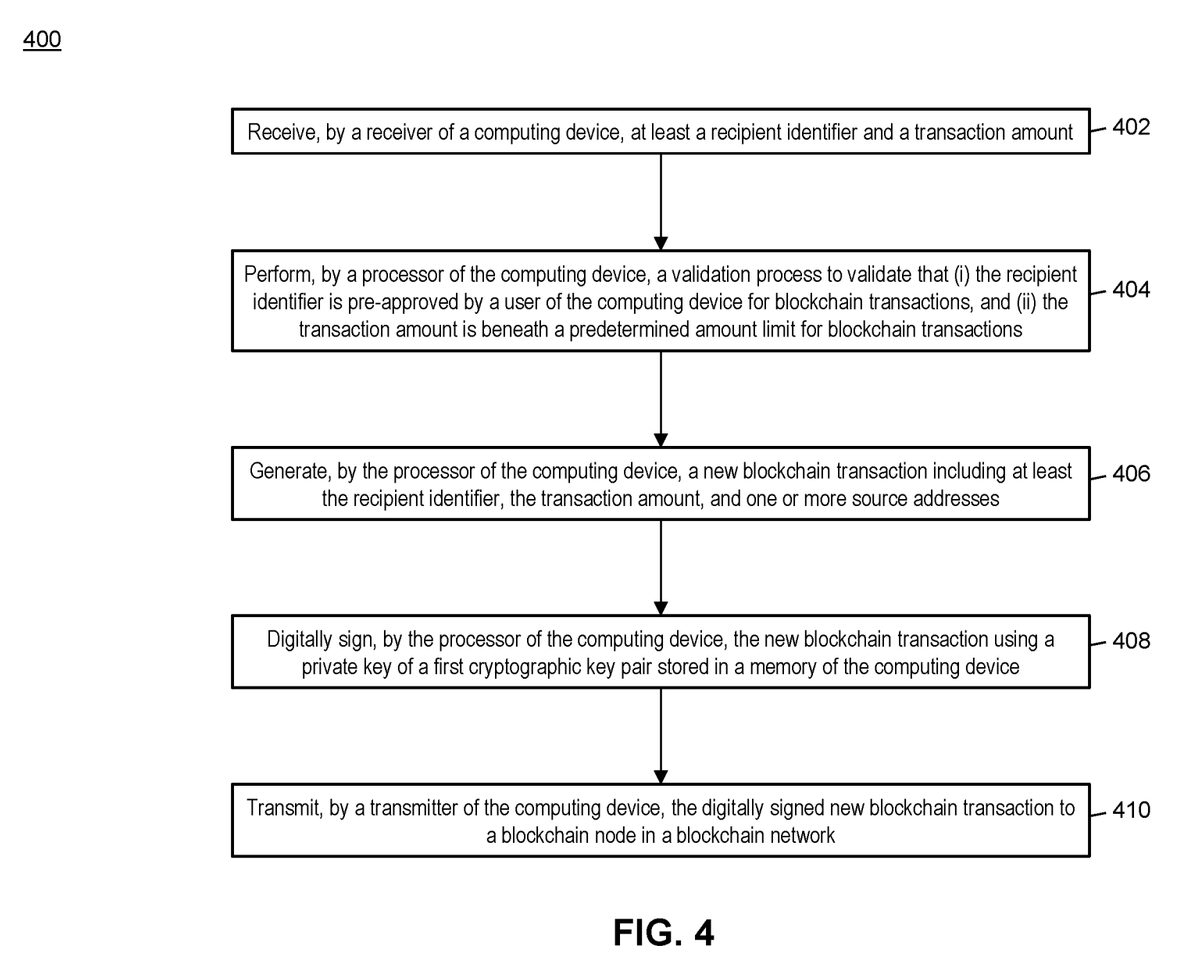
FIG. 4 is a flow chart illustrating an exemplary method for automatic initiation of blockchain transactions with pre-approved recipients in accordance with exemplary embodiments.

FIG. 4 illustrates a method 400 for the automatic initiation of a blockchain transaction with a pre-approved recipient.

In step 402, at least a recipient identifier and a transaction amount can be received by a receiver (e.g., receiving device 202) of a computing device (e.g., computing device 102). In step 404, a validation process can be performed by a processor (e.g., validation module 220) of the computing device to validate that (i) the recipient identifier is pre-approved by a user of the computing device for blockchain transactions, and (ii) the transaction amount is beneath a predetermined amount limit for blockchain transactions.

In step 406, a new blockchain transaction can be generated by the processor (e.g., generation module 218) of the computing device that includes at least the recipient identifier, the transaction amount, and one or more source addresses. In step 408, the processor (e.g., generation module 218) of the computing device can digitally sign the new blockchain transaction using a private key of a first cryptographic key pair stored in a memory (e.g., memory 214) of the computing device. In step 410, the digitally signed new blockchain transaction can be transmitted by a transmitter (e.g., transmitting device 222) of the computing device to a blockchain node (e.g., blockchain node 106) in a blockchain network (e.g., blockchain network 104).

In one embodiment, the recipient identifier and transaction amount can be decoded by the computing device from a machine-readable code displayed at a geographic location associated with a merchant. In some embodiments, the recipient identifier can be one of: a blockchain address and a public key of a second cryptographic key pair. In one embodiment, the method 400 can further include: receiving, by the receiver of the computing device, a transaction hash value from the blockchain node; and transmitting, by the transmitter of the computing device, the transaction hash value to a merchant device. In a further embodiment, the recipient identifier and the transaction amount can be received from the merchant device.

In some embodiments, the validation process can include: transmitting, by the transmitter of the computing device, at least the recipient identifier, the transaction amount, and a sending identifier associated with the computing device to a provider system (e.g., provider system 110); and receiving, from the provider system, a confirmation message indicating a positive validation that (i) the recipient identifier is pre-approved by a user of the computing device for blockchain transactions, and (ii) the transaction amount is beneath a predetermined amount limit for blockchain transactions. In one embodiment, the validation process can include verifying, by the processor (e.g., validation module 220) of the computing device, that the recipient identifier is stored in a database (e.g., account database 206) of pre-approved recipients, wherein the predetermined amount limit is associated with the recipient identifier in the database of pre-approved recipients. In some embodiments, the validation process can include: identifying, by the processor of the computing device, a smart contract stored on a blockchain associated with the blockchain network, wherein the smart contract includes at least a sending identifier associated with the computing device; and verifying, by the processor of the computing device, that the recipient identifier and predetermined amount limit are included in the smart contract.

Computer System Architecture

FIG. 5 illustrates a computer system 500 in which embodiments of the present disclosure, or portions thereof, can be implemented as computer-readable code. For example, the computing device 102, blockchain nodes 106, merchant system 108, and provider system 110 can be implemented in the computer system 500 using hardware, non-transitory computer readable media having instructions stored thereon, or a combination thereof and can be implemented in one or more computer systems or other processing systems. Hardware can embody modules and components used to implement the methods of FIGS. 3A-3C and 4.

If programmable logic is used, such logic can execute on a commercially available processing platform configured by executable software code to become a specific purpose computer or a special purpose device (e.g., programmable logic array, application-specific integrated circuit, etc.). A person having ordinary skill in the art can appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, at least one processor device and a memory can be used to implement the above-described embodiments.

A processor unit or device as discussed herein can be a single processor, a plurality of processors, or combinations thereof. Processor devices can have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

Processor device 504 can be a special purpose or a general purpose processor device specifically configured to perform the functions discussed herein. The processor device 504 can be connected to a communications infrastructure 506, such as a bus, message queue, network, multi-core message-passing scheme, etc. The network can be any network suitable for performing the functions as disclosed herein and can include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 can also include a main memory 508 (e.g., random access memory, read-only memory, etc.), and can also include a secondary memory 510. The secondary memory 510 can include the hard disk drive 512 and a removable storage drive 514, such as a floppy disk drive, a magnetic tape drive, an optical disk drive, a flash memory, etc.

The removable storage drive 514 can read from and/or write to the removable storage unit 518 in a well-known manner. The removable storage unit 518 can include a removable storage media that can be read by and written to by the removable storage drive 514. For example, if the removable storage drive 514 is a floppy disk drive or universal serial bus port, the removable storage unit 518 can be a floppy disk or portable flash drive, respectively. In one embodiment, the removable storage unit 518 can be non-transitory computer readable recording media.

In some embodiments, the secondary memory 510 can include alternative means for allowing computer programs or other instructions to be loaded into the computer system 500, for example, the removable storage unit 522 and an interface 520. Examples of such means can include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) can be stored on any type of suitable computer readable media, such as optical storage (e.g., a compact disc, digital versatile disc, Blu-ray disc, etc.) or magnetic tape storage (e.g., a hard disk drive). The data can be configured in any type of suitable database configuration, such as a relational database, a structured query language (SQL) database, a distributed database, an object database, etc. Suitable configurations and storage types will be apparent to persons having skill in the relevant art.

The computer system 500 can also include a communications interface 524. The communications interface 524 can be configured to allow software and data to be transferred between the computer system 500 and external devices. Exemplary communications interfaces 524 can include a modem, a network interface (e.g., an Ethernet card), a communications port, a PCMCIA slot and card, etc. Software and data transferred via the communications interface 524 can be in the form of signals, which can be electronic, electromagnetic, optical, or other signals as will be apparent to persons having skill in the relevant art. The signals can travel via a communications path 526, which can be configured to carry the signals and can be implemented using wire, cable, fiber optics, a phone line, a cellular phone link, a radio frequency link, etc.

The computer system 500 can further include a display interface 502. The display interface 502 can be configured to allow data to be transferred between the computer system 500 and external display 530. Exemplary display interfaces 502 can include high-definition multimedia interface (HDMI), digital visual interface (DVI), video graphics array (VGA), etc. The display 530 can be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium can refer to memories, such as the main memory 508 and secondary memory 510, which can be memory semiconductors (e.g., DRAMs, etc.). These computer program products can be means for providing software to the computer system 500. Computer programs (e.g., computer control logic) can be stored in the main memory 508 and/or the secondary memory 510. Computer programs can also be received via the communications interface 524. Such computer programs, when executed, can enable computer system 500 to implement the present methods as discussed herein. In particular, the computer programs, when executed, can enable processor device 504 to implement the methods illustrated by FIGS. 3A-3C and 4, as discussed herein. Accordingly, such computer programs can represent controllers of the computer system 500. Where the present disclosure is implemented using software, the software can be stored in a computer program product and loaded into the computer system 500 using the removable storage drive 514, interface 520, and hard disk drive 512, or communications interface 524.

The processor device 504 can comprise one or more modules or engines configured to perform the functions of the computer system 500. Each of the modules or engines can be implemented using hardware and, in some instances, can also utilize software, such as corresponding to program code and/or programs stored in the main memory 508 or secondary memory 510. In such instances, program code can be compiled by the processor device 504 (e.g., by a compiling module or engine) prior to execution by the hardware of the computer system 500. For example, the program code can be source code written in a programming language that is translated into a lower level language, such as assembly language or machine code, for execution by the processor device 504 and/or any additional hardware components of the computer system 500. The process of compiling can include the use of lexical analysis, preprocessing, parsing, semantic analysis, syntax-directed translation, code generation, code optimization, and any other techniques that can be suitable for translation of program code into a lower-level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for automatic initiation of a blockchain transaction with a pre-approved recipient. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or can be acquired from practicing of the disclosure, without departing from the breadth or scope.

What is claimed is:

1. A method for automatic initiation of a blockchain transaction with a pre-approved recipient, comprising:
   scanning, by a scanning device of a computing device of a user, a machine-readable code associated with a merchant system;
   obtaining at least (i) a recipient identifier that identifies a blockchain wallet of the merchant system and (ii) a transaction amount by decoding, by a processor of the computing device, the scanned machine-readable code;
   performing, by a processor of the computing device, a validation process that validates (i) the recipient identifier as being pre-approved by a user of the computing device for blockchain transactions, and (ii) the transaction amount as being below a predetermined amount limit associated with the recipient identifier for blockchain transactions;
   generating, by the processor of the computing device, a new blockchain transaction including at least the recipient identifier, the transaction amount, and one or more source addresses;
   digitally signing, by the processor of the computing device, the new blockchain transaction using a private key of a first cryptographic key pair stored in a memory of the computing device; and
   transmitting, by a transmitter of the computing device, the digitally signed new blockchain transaction to a blockchain node in a blockchain network.

2. The method of claim 1, wherein the recipient identifier and transaction amount are decoded by the computing device from a machine readable code displayed at a geographic location associated with a merchant.

3. The method of claim 1, wherein the recipient identifier is one of: a blockchain address and a public key of a second cryptographic key pair.

4. The method of claim 1, further comprising:
   receiving, by the receiver of the computing device, a transaction hash value from the blockchain node; and
   transmitting, by the transmitter of the computing device, the transaction hash value to a merchant device.

5. The method of claim 4, wherein the recipient identifier and the transaction amount are received from the merchant device.

6. The method of claim 1, wherein the validation process includes:
   transmitting, by the transmitter of the computing device, at least the recipient identifier, the transaction amount, and a sending identifier associated with the computing device to a provider system; and
   receiving, from the provider system, a confirmation message indicating a positive validation that (i) the recipient identifier is pre-approved by a user of the computing device for blockchain transactions, and (ii) the transaction amount is beneath a predetermined amount limit for blockchain transactions.

7. The method of claim 1, wherein the validation process includes verifying, by the processor of the computing device, that the recipient identifier is stored in a database of pre-approved recipients, wherein the predetermined amount limit is associated with the recipient identifier in the database of pre-approved recipients.

8. The method of claim 1, wherein the validation process includes:
   identifying, by the processor of the computing device, a smart contract stored on a blockchain associated with the blockchain network, wherein the smart contract includes at least a sending identifier associated with the computing device; and
   verifying, by the processor of the computing device, that the recipient identifier and predetermined amount limit are included in the smart contract.

9. A system for automatic initiation of a blockchain transaction with a pre-approved recipient, comprising:
   a blockchain network;
   a blockchain node included in the blockchain network; and
   a computing device, the computing device including
      a memory storing a private key of a first cryptographic key pair,
      a scanning device scanning a machine-readable code associated with a merchant system,
      a processor
         obtaining at least (i) a recipient identifier that identifies a blockchain wallet of the merchant system and (ii) a transaction amount by decoding the scanned machine-readable code,
         performing a validation process that validates (i) the recipient identifier as being pre-approved by a user of the computing device for blockchain transactions, and (ii) the transaction amount as being below a predetermined amount limit associated with the recipient identifier for blockchain transactions,
         generating a new blockchain transaction including at least the recipient identifier, the transaction amount, and one or more source addresses, and
         digitally signing the new blockchain transaction using the private key of a first cryptographic key pair, and
      a transmitter transmitting the digitally signed new blockchain transaction to the blockchain node.

10. The system of claim 9, further comprising:
   a machine readable code displayed at a geographic location associated with a merchant, wherein the recipient identifier and transaction amount are decoded by the computing device from the machine readable code.

11. The system of claim 9, wherein the recipient identifier is one of: a blockchain address and a public key of a second cryptographic key pair.

12. The system of claim 9, further comprising:
   a merchant device, wherein
   the receiver of the computing device receives a transaction hash value from the blockchain node, and
   the transmitter of the computing device transmits the transaction hash value to a merchant device.

13. The system of claim 12, wherein the recipient identifier and the transaction amount are received from the merchant device.

14. The system of claim 9, further comprising:
   a provider system, wherein
   the validation process includes:
      transmitting, by the transmitter of the computing device, at least the recipient identifier, the transaction amount, and a sending identifier associated with the computing device to the provider system; and
      receiving, from the provider system, a confirmation message indicating a positive validation that (i) the recipient identifier is pre-approved by a user of the computing device for blockchain transactions, and (ii) the transaction amount is beneath a predetermined amount limit for blockchain transactions.

15. The system of claim 9, wherein the validation process includes verifying, by the processor of the computing device, that the recipient identifier is stored in a database of pre-approved recipients, wherein the predetermined amount limit is associated with the recipient identifier in the database of pre-approved recipients.

16. The system of claim 9, wherein the validation process includes:
   identifying, by the processor of the computing device, a smart contract stored on a blockchain associated with the blockchain network, wherein the smart contract includes at least a sending identifier associated with the computing device; and
   verifying, by the processor of the computing device, that the recipient identifier and predetermined amount limit are included in the smart contract.

* * * * *